Sept. 19, 1961 T. J. TULP 3,001,090
TRANSISTOR MEMORY DEVICE
Filed Nov. 29, 1957

INVENTOR
THEODORUS JOANNES TULP
BY Frank R. Jeifari
AGENT

United States Patent Office 3,001,090
Patented Sept. 19, 1961

3,001,090

TRANSISTOR MEMORY DEVICE

Theodorus Joannes Tulp, Eindhoven, Netherlands, assignor to North American Philips Company, Inc., New York, N.Y., a corporation of Delaware Filed Nov. 29, 1957, Ser. No. 699,841
Claims priority, application Netherlands Jan. 5, 1957
6 Claims. (Cl. 307—88.5)

The invention relates to devices for reading in and reading out transistors of the current-amplifying type which are active as memory elements. This is done by means of reading-in pulses supplied between the emitter and the base, so that free charge storage is produced in the base zone, and also by means of interrogating pulses which occur after the reading-in pulses and are active as a collector supply voltage. An object of the invention is to provide a device in which a short time after the transistor has been read out, the free charge storage still available is erased, so that the transistor is again ready for subsequent reading-in.

For this purpose, it has previously been suggested that immediately after the end of the interrogating pulses, an erasing pulse should be supplied through a blocking rectifier to the base of the transistor with a polarity opposite to the base-emitter forward direction. The invention provides means by which this source of erasing pulses and possibly even the associated blocking rectifiers may be dispensed with. It is characterized in that the transistor is connected to a positive feedback circuit of a type known per se, in which during the occurrence of interrogating pulses an increased forward voltage is produced at the base, the forward voltage being immediately followed by a counter voltage which substantially expels the free charge storage still present in the base zone.

In order that the invention may be readily carried into effect, several embodiments will now be described more fully, by way of example, with reference to the accompanying drawing, in which.

Figure 1:
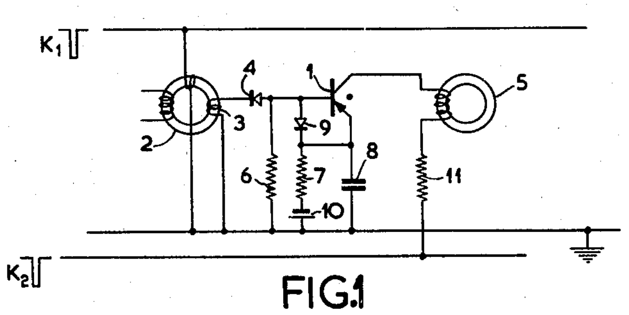
FIG. 1 shows one embodiment of the invention, in which a capacitative impedance is included in the emitter circuit.

FIG. 1 shows a transistor 1, which is active as a memory element. Reading-in pulses are produced across an input winding 3 by reversion of the remanent magnetisation of a memory core 2 by means of clock pulses $K_1$. The input pulses reach the base of transistor 1 via a blocking rectifier 4 and produce free charge storage in the base zone. In order to test whether this free charge storage is present or not, that is to say whether the magnetisation of the core 2 has reversed or not, after the end of each pulse $K_1$ a reading-out clock pulse or interrogating pulse $K_2$ is supplied to the collector of transistor 1, which is thus traversed by current in the presence of free charge storage and not traversed by current in the absence of free charge storage. This current may serve to control the magnetisation of a subsequent memory core 5, in which event the device may serve as a shift unit, for example for computer purposes.

The transistor 1 is of the current-amplifying type, that is to say, its emitter-collector current amplification factor $\alpha$ is higher than unity. Examples of such transistors are found among point-contact transistors and also junction transistors of the pnpn- or npnp-type. This current-amplifying property is indicated in the figure by the addition of a dot to the usual transistor symbol.

As is well-known, this property has the effect that a resistor 6, included in the base circuit, is active as a positive feed-back resistor, so that during the occurrence of the reading-out clock pulse $K_2$, an increased forward voltage with respect to the emitter is set up at the base of transistor 1 and the transistor is traversed by a larger current. This current gives rise to a voltage drop across an emitter resistor 7 with the result that the comparatively small emitter capacitor 8 is charged after a short period. The voltage between the emitter and the collector then decreases to a value so low that the current amplification of the transistor decreases to unity. The positive feed-back then ceases, so that the base of transistor 1 again reaches earth potential, whereas its emitter still has negative potential due to the presence of capacitor 8. Consequently, immediately after said increased forward voltage, a counter voltage is produced between the base and the emitter, which voltage expels the free storage remaining in the base zone.

In this connection, it is mentioned that the use of a feed-back circuit comprising a base resistor and an emitter resistor with parallel capacitor is known per se in current-amplifying transistors with fixed collector supply voltage and controlled by triggering pulses. The invention utilizes such a known feed-back circuit in a transistor which is active as a memory element due to its free charge storage and which is supplied by collector interrogating (read out) pulses, in order to expel the unwanted free charge storage which still remains after reading out.

In one practical embodiment, use was made of a transistor 1, having a current gain factor $\alpha=3.5$. The resistor 6 then was 150 Ω, the resistor 7=740 Ω, the capacitor 8=2200 pf. and the collector resistor 11=600 Ω. The clock pulses $K_1$ and $K_2$ had a duration of 1 and 3 $\mu$ secs., respectively, the interval between the pulses $K_2$ and $K_1$ was ½ $\mu$ sec. The amplitude of $K_2$ was 30 volts. The amplitude of the pulses produced by the winding 3 was 1 volt.

To enable the capacitor 8 to discharge rapidly, a dry-rectifier 9 was provided, which became conducting only at a forward voltage higher than about 0.2 volt, which voltage appeared sufficient for completely expelling the free charge in the base zone of transistor 1. The emitter-collector resistance during conduction of current by the transistor was then only 10 Ω. In order to avoid unwanted conduction in the absence of free charge storage, a threshold voltage source 10 of 1.4 volts was provided.

With the above-mentioned adjustment, for which the resistor 7 is larger than $(\alpha-1)$ times the resistor 6, the transistor 1 invariably returns to its cut-off condition irrespective of the duration of the clock pulse $K_2$. As an alternative, it is possible to give the resistor 7 a lower value, so that the transistor 1 is cut off only at the end of the clock pulse $K_2$ itself and the free charge is expelled by the voltage which then still exists across capacitor 8. Such a circuit could alternatively be equipped with non-current amplifying transistors, but in this case the presence of resistor 7 and capacitor 8 would involve the disadvantage that the emitter base voltage active during the clock pulse $K_2$ and hence the collector current produced would show a gradual decrease, whereas for controlling memory cores, use is preferably made of rectangular current pulses.

Figure 2:
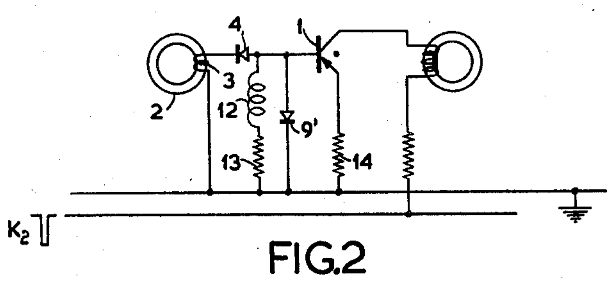
FIG. 2 shows an embodiment in which an inductive impedance is included in the base circuit.

FIG. 2 shows a different feedback circuit known per se for transistor triggers, which comprises a base inductance 12, if desired in series with a resistor 13, and an emitter resistor 14. A considerable negative voltage is set up across inductance 12 during the reading-out clock pulses $K_2$, but as soon as the current-amplification factor $\alpha$ decreases to unity as a result of too low emitter-collector voltage, the negative voltage changes to a positive voltage pulse expelling the residual free charge.

The reading-out pulse also flows via rectifier 4 through the winding 3 and causes the core 2 to be restored to its initial condition of magnetisation. This effect can be avoided, if necessary, with suitable proportioning of the circuit and/or by provision of a shunt rectifier 9', similar to rectifier 9 of FIG. 1.

Figure 3:
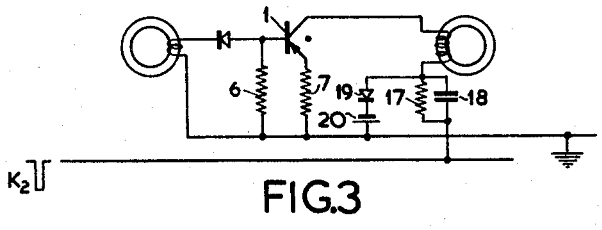
FIG. 3 shows an embodiment in which a capacitative impedance is included in the collector circuit.

The embodiment shown in FIG. 3 utilises a resistor 6 larger than ($\alpha$—1) times the resistor 7, while the collector circuit of transistor 1 includes a large resistor 17, shunted by a small capacitor 18. In the presence of free charge storage in the base zone of transistor 1, current flows through resistors 6, 7 and 17, at the moment when the clock pulse $K_2$ occurs, so that at first an increased forward voltage is produced between the base and the emitter, but then, as soon as the capacitor 18 has charged sufficiently, the emitter-collector voltage decreases to an extent such that the transistor 1 tends to return to its cut-off condition. Consequently, a counter voltage becomes active between the emitter and the base, which voltage expels the residual free charge. The voltage set up across capacitor 18 leaks away after the end of the pulse $K_2$ via a rectifier 19, provided if desired with a small biassing potential from a source 20.

It is to be understood that the above-described arrangements are illustrative of the application of the principles of the invention. Numerous other arrangements are possible without departing from the spirit and scope of the invention. The quantitative values given are provided for illustrative purposes only.

What is claimed is:

1. A memory device comprising a transistor having a base zone, a base electrode connected to said base zone and to a base circuit, and emitter and collector electrodes, said transistor having a collector-emitter current amplification factor greater than one, means for applying read-in pulse between said base and emitter electrodes whereby a storage of free charge carriers is produced in said base zone, means for applying a read-out pulse to said collector electrode after each read-in pulse, said read-out pulse being the sole source of supply voltage for said collector electrode, regenerative feed-back means connected in the base circuit of the transistor, said feedback means being operative to increase the forward bias voltage effective between the base and emitter electrodes during the occurrence of a read-out pulse, and a network having a predetermined time constant connected in operative relation with said feedback circuit and operating to limit the duration of the increased forward bias voltage and to abruptly reverse the polarity of the bias voltage effective between the base and emitter electrodes, said bias voltage of reversed polarity substantially expelling any free charge carriers still present in the base zone.

2. A memory device according to claim 1, said time constant network including the parallel combination of a resistor and a capacitor connected in the emitter circuit of the transistor.

3. A memory device comprising a transistor having a base zone, a base electrode connected to said base zone and to a base circuit, and emitter and collector electrodes, said transistor having a collector-emitter current amplication factor greater than one, means for applying read-in pulses between said base and emitter electrodes whereby a storage of free charge carriers is produced in said base zone, means for applying a read-out pulse to said collector electrode after each read-in pulse, said read-out pulse being the sole source of supply voltage for said collector electrode, regenerative feedback means comprising an inductance connected in the base circuit of the transistor, said feedback means being operative to increase the forward bias voltage effective between the base and emitter electrodes during the occurrence of a read-out pulse, and a network having a predetermined time constant connected in operative relation with said feedback circuit and operating to limit the duration of the increased forward bias voltage and to abruptly reverse the polarity of the bias voltage effective between the base and emitter electrodes, said bias voltage of reversed polarity substantially expelling any free charge carriers still present in the base zone.

4. A memory device comprising a transistor having a base zone, a base electrode connected to said base zone and to a base circuit, and emitter and collector electrodes, said transistor having a collector-emitter current amplication factor greater than one, means for applying read-in pulses between said base and emitter electrodes whereby a storage of free charge carriers is produced in said base zone, means for applying a read-out pulse to said collector electrode after each read-in pulse, said read-out pulse being the sole source of supply voltage for said collector electrode, regenerative feedback means connected in the base circuit of the transistor, said feedback means being operative to increase the forward bias voltage effective between the base and emitter electrodes during the occurrence of a read-out pulse, and a network including the parallel combination of a resistor and a capacitor coupled to the collector electrode of the transistor, said network having a predetermined time constant and operating to limit the duration of the increased forward bias voltage and to abruptly reverse the polarity of the bias voltage effective between the base and emitter electrodes, said bias voltage of reversed polarity substantially expelling any free charge carriers still present in the base zone.

5. A device according to claim 2, further including a diode coupled between said parallel combination and said base electrode, said diode having the same current-passing direction as the emitter and base electrodes.

6. A device according to claim 3, further including a diode connected to said base electrode and across said inductance, said diode having the same current-passing direction as the emitter and base electrodes.

References Cited in the file of this patent

UNITED STATES PATENTS

| | | |
|---|---|---|
| 2,644,893 | Gehman | July 7, 1953 |
| 2,807,758 | Pinckaers | Sept. 24, 1957 |
| 2,866,106 | Schuh | Dec. 23, 1958 |
| 2,889,467 | Endres et al. | June 2, 1959 |
| 2,899,571 | Meyers | Aug. 11, 1959 |
| 2,901,640 | Steiman | Aug. 25, 1959 |